(12) United States Patent
Delaney

(10) Patent No.: US 7,240,237 B2
(45) Date of Patent: Jul. 3, 2007

(54) METHOD AND SYSTEM FOR HIGH BANDWIDTH FAULT TOLERANCE IN A STORAGE SUBSYSTEM

(75) Inventor: William P. Delaney, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 515 days.

(21) Appl. No.: 10/853,040

(22) Filed: May 25, 2004

(65) Prior Publication Data

US 2005/0278568 A1    Dec. 15, 2005

(51) Int. Cl.
*G06F 11/00* (2006.01)
(52) U.S. Cl. .................. 714/6; 714/5; 714/13; 714/43; 714/52
(58) Field of Classification Search ............... 714/5, 714/6, 13, 43, 52
See application file for complete search history.

(56) References Cited

U.S. PATENT DOCUMENTS

| | | | | |
|---|---|---|---|---|
| 5,832,198 A | * | 11/1998 | Lucht | 714/6 |
| 6,453,428 B1 | * | 9/2002 | Stephenson | 714/6 |
| 6,792,391 B1 | * | 9/2004 | Nanda | 714/6 |
| 6,851,082 B1 | * | 2/2005 | Corbett | 714/5 |
| 6,993,701 B2 | * | 1/2006 | Corbett et al. | 714/6 |
| 7,073,115 B2 | * | 7/2006 | English et al. | 714/6 |
| 7,080,278 B1 | * | 7/2006 | Kleiman et al. | 714/6 |
| 7,085,953 B1 | * | 8/2006 | Hsu et al. | 714/5 |
| 2005/0050384 A1 | * | 3/2005 | Horn | 714/6 |

* cited by examiner

*Primary Examiner*—Robert Beausoliel
*Assistant Examiner*—Joseph D Manoskey
(74) *Attorney, Agent, or Firm*—Timothy Croll

(57) ABSTRACT

The present invention is directed to a method and system for high bandwidth fault tolerance in a storage system while the system, maintaining dual parity scheme, may tolerate the failure of more than one disk. An array controller may comprise a parity buffer sufficiently large enough to hold all of the parity blocks for an entire stripe of data. This may provide for high bandwidth fault tolerance without reading the source blocks twice while the dual parity values are calculated using two different/independent parity computations for a given stripe. Such a dual parity scheme may allow the storage system to tolerate the failure of more than one disk.

20 Claims, 4 Drawing Sheets

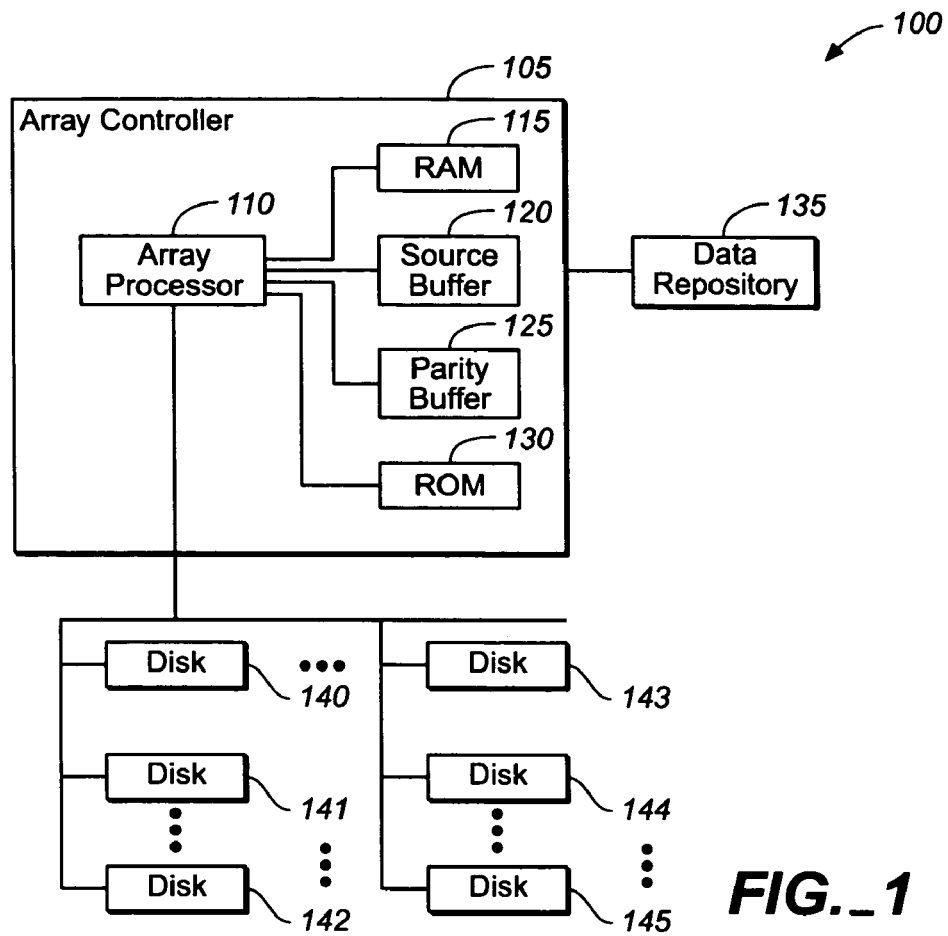
FIG._1
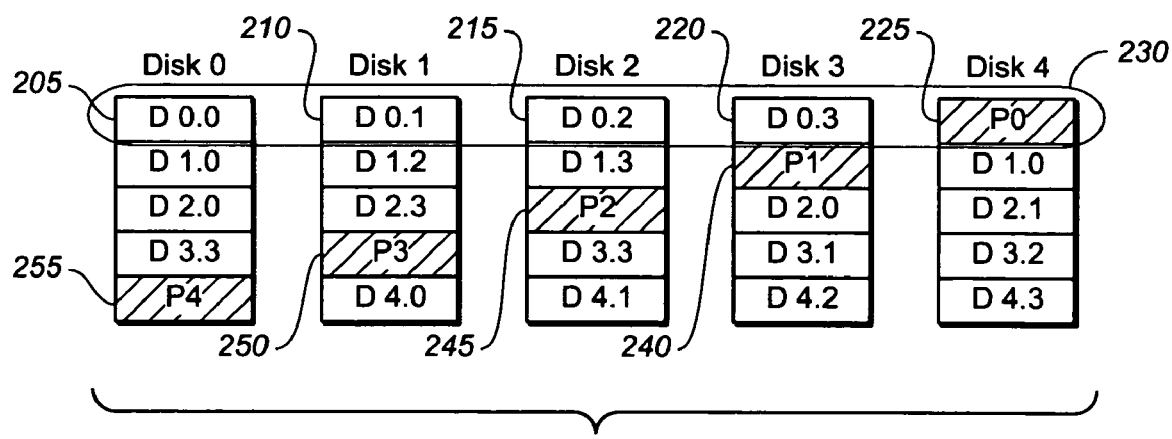
FIG._2

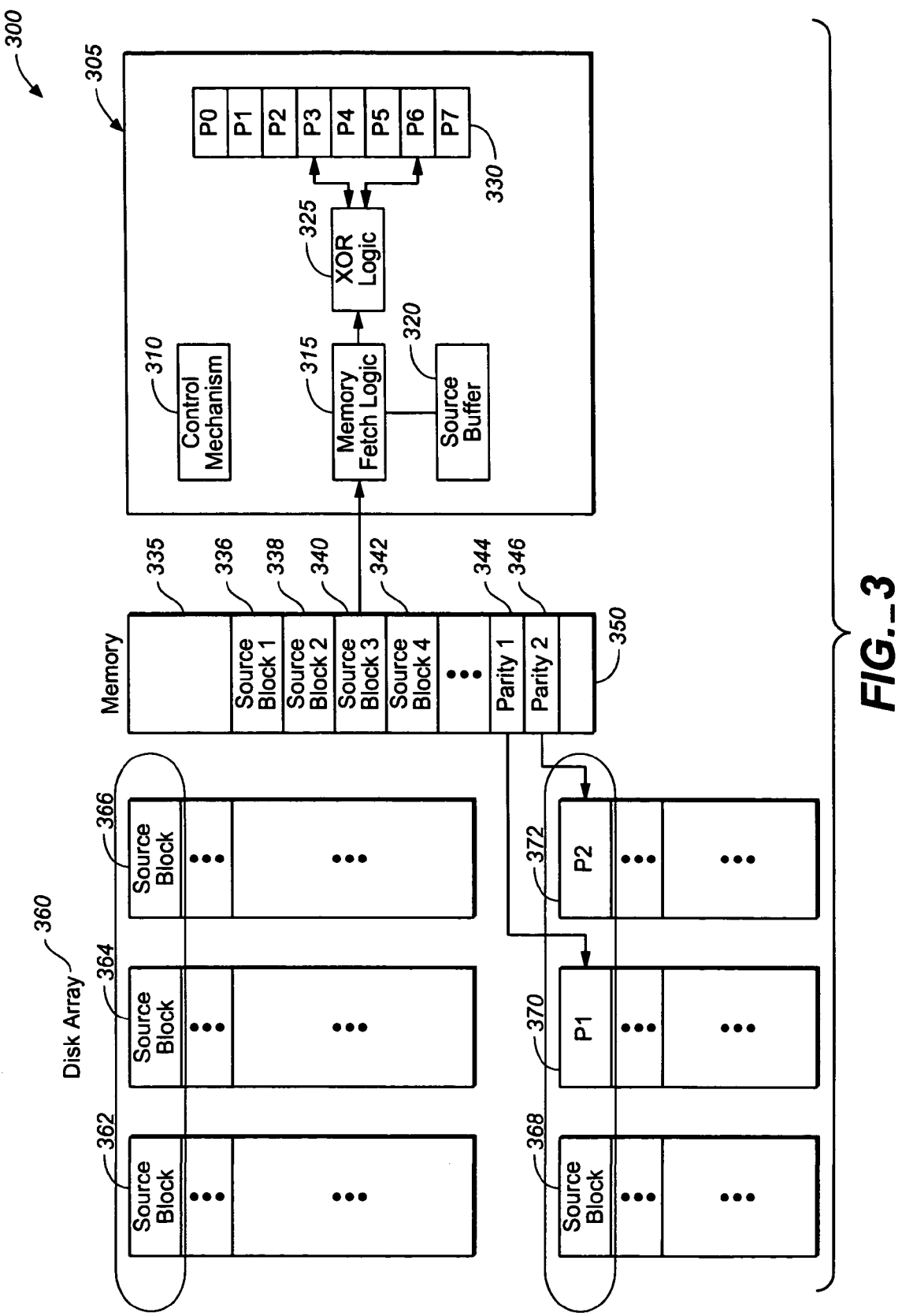
FIG._3

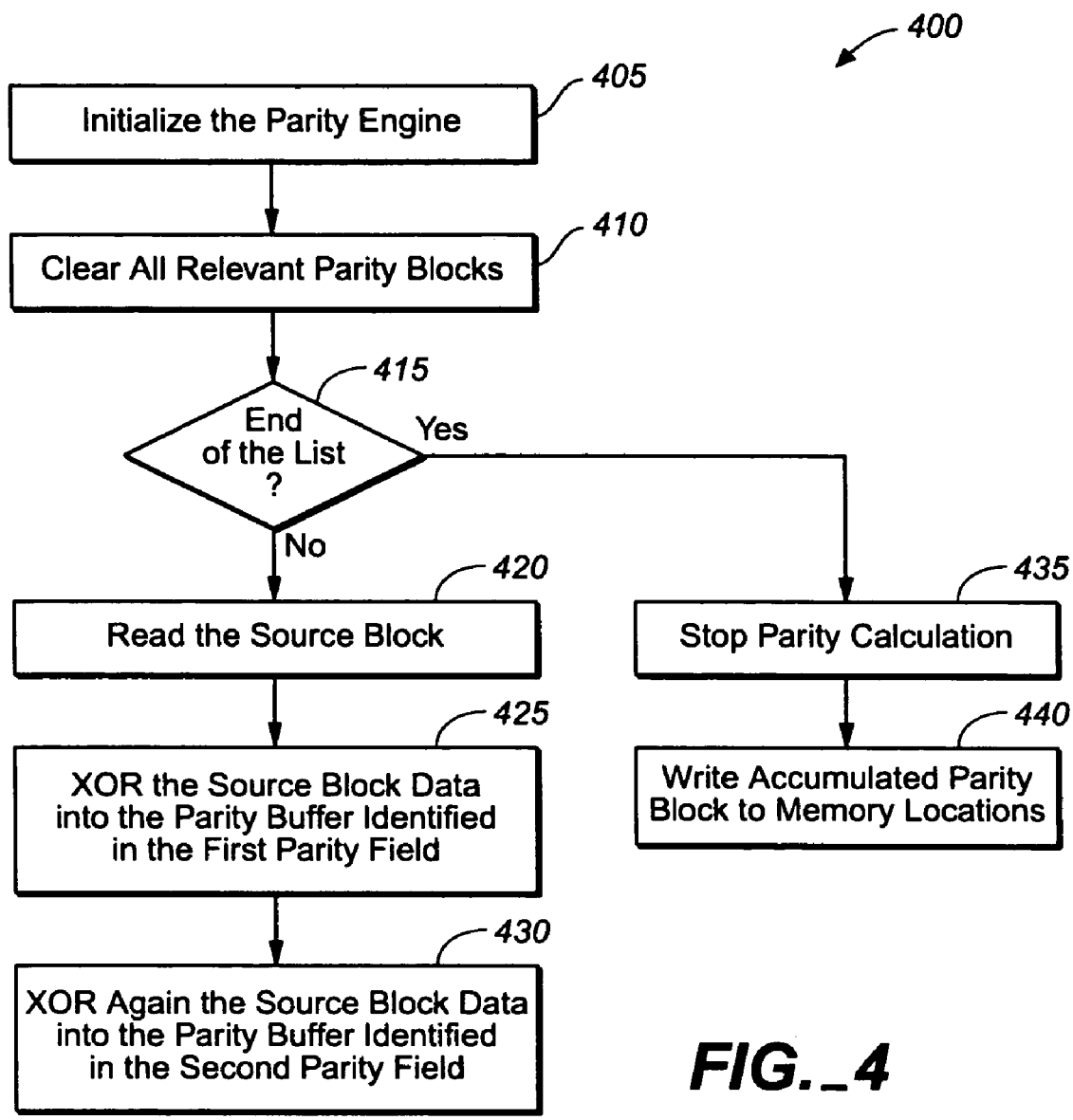
FIG._4

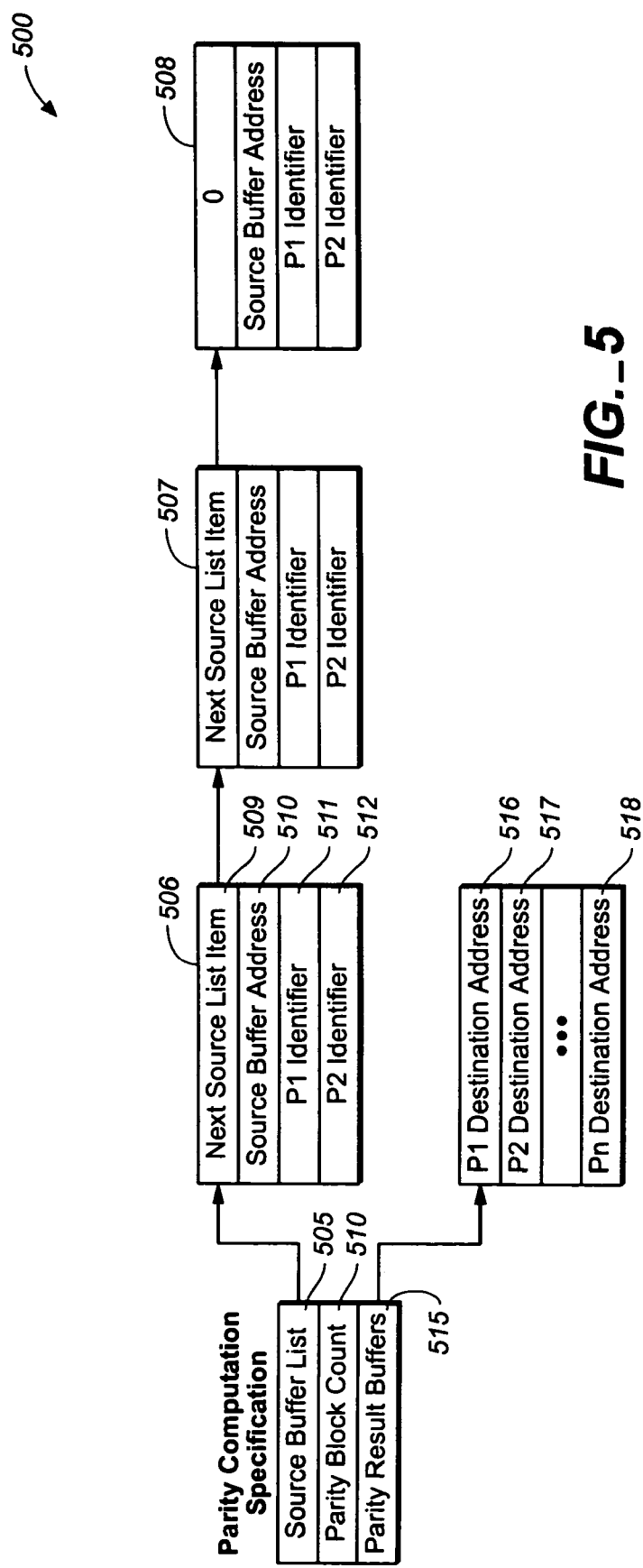
FIG._5

METHOD AND SYSTEM FOR HIGH BANDWIDTH FAULT TOLERANCE IN A STORAGE SUBSYSTEM

FIELD OF THE INVENTION

The present invention generally relates to the field of a recovery system for a storage systems and particularly to a failure recovery system for redundant arrays of independent disks (RAID).

BACKGROUND OF THE INVENTION

An effective storage subsystem is a critical concern in the computer system industry. Especially, the performance of a storage subsystem during its recovery from a disk failure is crucial to applications that mandate both high I/O performance and high data reliability. Effective storage subsystems may be required to provide not only the ability to recover from a disk failure without losing data, but also rapidly restore the system to its fault-free state, and have minimal impact on system performance as observed by users.

One of the most favored storage subsystems to achieve fault tolerance and enhance data availability may be redundant arrays of independent disks or redundant arrays of inexpensive disks (RAID) systems which are typically server-attached, networked, and equipped with internet storage application. Fault tolerance in a storage subsystem is generally achieved either by disk mirroring or by parity encoding, which various levels of RAID may provide.

RAID has been developed to combine multiple inexpensive disks drives into an array of disk drives to obtain performance, capacity and reliability that may exceed that of a single large disk drive. In RAID, the array of drives appears to the host computer as a single logical hard drive. By utilizing a striping technique, RAID provides adjustable partitions within one sector on a storage space of hard disks. The stripes of all the disks are interleaved and addressed in order. This allows overlapped disk Input/Output across drives.

There are several levels of RAID plus a nonredundant array (RAID Level 0). In RAID level 1, one or more duplicate copies of each user data unit are stored on separate disks (data mirroring). Other RAID levels (such as RAID levels 3, 4, and 5) store parity information but not redundant data (but parity information can be used to reconstruct data). Therefore, a small portion (as large as 25%, but often much smaller) of the array's physical storage is used to store an error correcting code (parity information) computed over the file system's data.

A RAID Level 5 breaks the data into blocks and stripes the data across disk drives. RAID level 5 also rotates the disks where the data and parity blocks are stored, i.e., all disks will have some parity blocks stored on them. All data and parity blocks are stored on different disks (striped). Generally, a failure of any one disk drive results in the loss of only one data block or the parity block. The array can then mathematically recreate the lost block using parity information. In RAID level 5, all read and write operations can be overlapped so it is best for multi-user systems in which performance is not critical or which do few write operations. A RAID level 6 takes this one step further and calculates two error correcting codes (parity information) using different mathematical formulas (dual parity system). This allows the array to have two failed disk drives and still be able to recreate all data.

An example of a typical RAID implementation may be a RAID level 5 controller (having a firmware implementing RAID level 5), based on a "descriptor" mechanism that allows the RAID controller to specify blocks of buffers in memory that are to be XOR'ed together to produce parity data. When the storage subsystem implements dual parity system (RAID level 6), the storage subsystem may have two failed disk drives and still be able to recreate all data and offers high fault tolerance. However, each data block within a stripe must participate in two independent error correcting code computations. Thus, each source data must be read twice. This is a significant drawback of RAID level 6. It may require approximately twice the memory bandwidth of the RAID level 5. Especially in application environments that demand very high bandwidth, the memory throughput of the RAID controller may be a critical factor of the storage subsystem's performance while the storage subsystem recovers from the failure of a disk drive. Consequently, the additional burden associated with reading each block of source data twice from memory may be a substantial detrimental effect on the overall system throughput when writing data in a RAID level 6 storage subsystems.

Therefore, it would be desirable to provide an effective data storage subsystem that offers high fault tolerance, with optimal memory bandwidth usage and reduced bottlenecks.

SUMMARY OF THE INVENTION

Accordingly, the present invention provides a method to improve performance of a RAID level 6 system by providing a solution in which the memory bandwidth usage for RAID level 6 system is essentially the same as required for the RAID level 5 system. In an embodiment of the invention, the system of the present invention may include an array controller coupled to redundant arrays of disk drives, which may comprise an array processor, a source buffer, a parity buffer and the like. The parity buffer may be large enough to store all of the parity blocks for an entire stripe of data so that the system may not have to read the source data twice for parity calculation. In another embodiment of the invention, the array controller software may specify the structure of the parity operations to be performed for a given stripe of data. The parity computation specific structure, comprising a source buffer list, a parity block count, and parity result buffers, may identify an association between a source block in the system memory and a buffer block in the parity buffer in the array controller. Upon completion of parity calculation of the entire stripe, the cumulative parity values in parity buffer blocks may be stored back to the system memory in locations specified by the control software. In an advantageous aspect of the present invention, dual parity information may allow the system to have two failed disk drives and still be able to recreate all data since the system can mathematically recreate the lost block using parity information. In another advantageous aspect of the present invention, more than one computation may take place concurrently. That may allow fill overlapping of operations and would ensure that no idle cycles exist on the system memory bus while parity computations are performed for a given specification.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a schematic block diagram of RAID system in accordance with an exemplary embodiment of the present invention;

FIG. 2 is a block diagram of a logical disk arrays map of RAID Level 5;

FIG. 3 is a block diagram of an array controller in accordance with an exemplary embodiment of the present invention;

FIG. 4 is a flow diagram of a parity computation in accordance with an exemplary embodiment of the present invention; and FIG. 5 is a block diagram of a parity computation specification structure in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

Referring generally now to FIGS. 1 through 5, exemplary embodiments of the present invention are shown.

Referring now to FIG. 1, a schematic block diagram of a storage subsystem 100 in accordance with an exemplary embodiment of the present invention is shown. The storage subsystem 100 may include an array controller 105 and a plurality of hard drives 140-145. Source data may be delivered from a data repository 105 such as a server or personal computer which is operatively connected to the array controller 105. The array controller 105 may comprise an array processor 110 coupled to a read only memory (ROM) 130, a source buffer 120 and a parity buffer 125 and a random access memory (RAM) 115. The array processor 110 preferably performs functions specific to the functionality of the array controller 105. The array processor 110 may execute programs (RAID firmware) stored on the ROM 130 in the RAM 115 and perform functions necessary to operate a RAID system. The array processor 105 may couple to a plurality of hard drives 140-145. Each hard drive of the plurality of hard drives 140-145 may have a dedicated disk interface. One of the examples of the disk interface may be a small computer system interface (SCSI). In an alternative embodiment, to aid the array processor 110 in making parity calculations and reconstructing fault information, array controller 105 may further comprise an application specific integrated circuit (ASIC). The ASIC may have the ability to perform multiple XOR operations simultaneously so that operational load on the array processor 110 is such that writes and reads to and from the array of disk drives completes with minimal delay.

FIG. 2 depicts an example of arrangement of data and parity on the disks of an array in RAID Level 5 system known to the art. In RAID system, the array of drives may appear to the host computer as a single logical hard drive. By utilizing a striping technique, RAID provides adjustable partitions within one sector on a storage space of hard disks. The stripes of all the disks are interleaved and addressed in order. Striping of all disks may be interleaved and orderly addressed. Logically continuous data is broken down into blocks and striped across the disks to allow for concurrent access by independent processes. A set of logical blocks of source data (source blocks) 205-220 and their corresponding parity blocks is referred to as a parity stripe or a stripe 230. Conventionally, parity may refer to an error-checking procedure in which the number of 1s must be the same for each group of bits transmitted without error. In RAID level 5 system, the parity value, a cumulative XORed value for the data stripe, may be used to reconstruct a failed disk to its fault free state. Each parity block 225-255 stores the parity value computed over corresponding data blocks in each stripe. For example, parity block 225 may store cumulative XORed value over source data blocks 205-220. Thus, the parity value for the stripe 230 is equivalent to D0.0 XOR D0.1 XOR D0.2 XOR D0.3. The assignment of parity blocks to disks may rotate across the array in order to avoid a hot spot contention. Thus, all disks will have some parity blocks stored on them. Any array containing a failed disk can be restored to its fault free state by successively reconstructing each block of the failed disk and storing it on a replacement drive.

In a typical RAID level 5 system, a reconstruction of data (data recovery) is accomplished by XOR calculation of the parity information and source data stored on the remaining drives which are not failed. Thus, if the host requests an array controller to retrieve data from a disk array that is a degraded state, the array controller may first read all the other data blocks on the stripe, including the parity block. The array controller performs all XOR calculations (on the data blocks and the parity block) before it returns the data that would have resided on the failed disk. The host is not aware that the disk has failed and array access continues. However, if a second disk also fails, the entire logical array will fail and the host will no longer have access to the data. The RAID level 6 system may work almost identically to the RAID level 5 system but the parity value is calculated and written twice. Consequently, the RAID level 6 system may tolerate the failure of more than one disk since it maintains a dual parity scheme. However, it may require that two independent parity computations be performed by the array controller. This may also mean that each source data must be read into the array controller twice (once for each parity calculation). In an advantageous aspect of the present invention the array controller may not read source data twice in order to calculate two different/independent parity computation.

Referring now to FIG. 3, a block diagram of an array controller in an embodiment of the present invention is shown. In an embodiment of the present invention an array controller 300 may comprise a parity engine 305 which includes a control mechanism 310, a memory fetch logic 315 coupled to a source buffer 320, a XOR logic 325, and a parity buffer 330. The parity buffer 330 may be sufficiently large enough to hold all of the parity blocks for an entire stripe of data. For example, the size of the parity buffer may be twice the size of the maximum stripe depth supported by a specific storage subsystem. Thus, the parity engine 305 can perform two different/independent parity computations for a given stripe without reading the source block 336-342 twice. Preferably, the parity buffer 330 and the source buffer 320 may be a RAM that offers very fast access time such as a static random access memory (SRAM). The parity engine 305 may not need to read the entire source block 336-342 into the source buffer. Depending on a memory implementation scheme in the storage subsystem, the parity engine 305 may process the source data using a "burst size" that is appropriate for the memory implementation. The parity engine 305 may couple to a cache memory (a system memory) 350 that may store source blocks 336-342 for a strip.

In an embodiment of the present invention, the array controller software may construct a specification structure that identifies the associations between source data blocks and parity blocks for a given stripe of data. These associations are specified as a sequence of items that linked together using a list structure, in which each item contains the memory address of the item that follows it. The specification structure will be explained in greater detail later. If the specified structure has no more source block to be processed, the parity engine will stop the parity calculation 435. The parity engine may write accumulated parity block to the designated memory locations 440.

Referring now to FIG. 4, a flow diagram of the parity computation process 400 is shown. The process begins when the parity engine 305 initialize relevant parity buffer blocks 405. Prior to beginning a parity computation per stripe, the parity engine automatically clears all the relevant parity blocks so that they have all zeros 410. This step is required to have a correct parity calculation for each data stripe. The parity engine may check whether it reached end of the specified structure 415. If the specified structure has a source block to be processed, the parity engine may read a source block from the memory and place it in a source buffer 420. The source block in the source buffer may be XORed into the parity buffer identified in the first parity field of the specification 425. The source block in the source buffer may be XORed into the parity buffer identified in the second parity field of the specification 430. For example, referring now to FIG. 3, the "source block3" 340 may participate in parity computation associated with parity blocks P3 and P6 in the parity buffer 330. The memory fetch logic 315 will fetch "source block3" 340 and place it in the source buffer 320. The source buffer 320 will be XORed with parity block P3 and with parity block P6, performing different/independent parity computation. Other source blocks 336-342 in the data stripe would typically also participate in the parity computation of parity blocks P3 and P6. Thus parity blocks P3 and P6 may have accumulated parity values. Upon completion of parity calculation of the entire stripe, the parity values in P3 and P6 may be stored back to the cache memory in locations specified by the control software.

In a typical implementation of RAID system, the control software may then manage a disk access sequence that would cause the two parity blocks 344-346, along with other relevant source blocks 336-342, to be written to the appropriate array of disk drives 360 to implement the desired dual parity RAID protection scheme (RAID level 6).

In an advantageous aspect of the present invention, the above described "full-stripe parity" calculation based on "full-stripe write" method may perform more efficiently than parity calculation based on "read-modify-write" method. In a conventional implementation of RAID system, when the data in a stripe is changed, the parity information is also changed. The "full-stripe write" method is based on accessing all of the data in the modified stripe and regenerate parity from that data. Since the stripe of data is already in the system memory (a cache memory), parity can be regenerated without having to read data from the disk. On the other hand, "read-modify-write" method is based on determining which data bits changed by the write operation and changing only the corresponding parity bits. This is done by first reading the old data which is to be overwritten. This data then XORed with the new data that is to be written. The result is a bit mask which has a 1 in the position of every bit which has changed. This bit mask is then XORed with the old parity information form the disk. This results in the corresponding bits being changed in the parity information. The new updated parity is then written back to the array. Thus, the "read-modify-write" method requires two reads, two writes and two XOR operations.

FIG. 5 shows a block diagram of a parity computation specification structure 500. The parity computation specification structure may include a source buffer list 505, a parity block count 510, and parity result buffers 515. The source buffer list 505 may be the memory address of the first data structure item 506-508 in the list of data structure items that identifies the memory locations of the various source data blocks that are part of the source data stripe. Each list items 506-508 also contains "next" pointer 509 that leads to the next item in the list, the memory address of the source data buffer 510, and P1 identifier 511 and P2 identifier 512 that may contain information of which two parity buffer blocks are associated with the data block. Referring back to FIG. 3, the parity buffer blocks 305 may be identified by their sequence number within the engine, such as P0, P1, and the like. The parity block count 510 may indicate the number of parity buffer blocks within the parity engine 330 that may be needed for the stripe's parity computation. There are two reasons for including the parity block counts. First the parity engine needs to know how many of the buffer blocks to clear with zeros before starting to process the source data stripe (initialization of parity buffer). Second, the count value provides information about the number of parity buffers to be stored back into system memory when the calculation is complete. The parity result buffers 515 may provide the memory location of a list of buffer addresses 516-518 that informs the parity engine where to store each of the parity accumulation buffers after the parity computation is complete.

In an alternative embodiment of the present invention, more than one computation may take place concurrently. That may allow full overlapping of operations and would ensure that no idle cycles exist on the system memory bus while parity computations are performed for a given specification. This type of pipelining is well understood by those practiced in the art.

It is believed that the storage subsystem of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for providing high bandwidth fault tolerance in a storage subsystem, said method comprising the steps of:

initializing a first buffer in an array controller;

reading a source block from a cache memory to a second buffer in said array controller;

computing a first error correction code of said source block into a first block in said first buffer;

computing a second error correction code of said source block into a second block in said first buffer; and writing at least two error correction codes stored in said first buffer to said cache memory upon completion of error correction computation for a data stripe, wherein said data stripe is divided into a plurality of source blocks in said storage subsystem and said storage subsystem uses one of said at least two error correction codes to reconstruct said data stripe in case said data stripe has a faulted data block.

2. The method as claimed in claim 1, wherein said initializing of said first buffer in said array controller includes the steps of:
finding a plurality of buffer blocks in said first buffer, said plurality of buffer blocks associated to said source block; and
clearing said plurality of buffer blocks in said first buffer.

3. The method as claimed in claim 1, wherein said array controller is adopted to calculate error correction codes using at least two independent equations.

4. The method as claimed in claim 3, wherein said at least two independent equations include an XOR operation.

5. The method as claimed in claim 1, wherein said first buffer is at least twice size of the maximum stripe depth supported by said storage subsystem.

6. The method as claimed in claim 1, further comprising the step of constructing a specific structure, said specific structure identifying an association between said source block in said cache memory and said buffer block in said first buffer, wherein said specific structure includes a next pointer, a buffer block count, and memory locations of said first error correction code and said second error correction code.

7. The method as claimed in claim 1, wherein said data stripe is a logical division of data stored in a redundant array of independent disk drives.

8. The method as claimed in claim 1, wherein said error correction code is parity information.

9. A system for providing high bandwidth fault tolerance in a storage subsystem, said system comprising:
means for initializing a first buffer in an array controller;
means for reading a source block from a cache memory to a second buffer in said array controller;
means for computing a first error correction code of said source block into a first block in said first buffer;
means for computing a second error correction code of said source block into a second block in said first buffer; and
means for writing at least two error correction codes stored in said first buffer to a system memory upon completion of error correction computation for an data stripe,
wherein said data stripe is divided into a plurality of source blocks in said storage subsystem and said storage subsystem uses one of said at least two error correction codes to reconstruct said data stripe when said data stripe has a faulted data block.

10. The system as claimed in claim 9, wherein said initializing of said first buffer in said array controller includes the steps of:
means for finding a plurality of buffer blocks in said first buffer, said plurality of buffer blocks associated to said source block; and
means for clearing said plurality of buffer blocks in said first buffer.

11. The system as claimed in claim 9, wherein said array controller is adopted to calculate error correction codes using at least two independent equations.

12. The system as claimed in claim 11, wherein said at least two independent equations include an XOR operation.

13. The system as claimed in claim 9, wherein said first buffer is at least twice size of the maximum stripe depth supported by said storage subsystem.

14. The system as claimed in claim 9, further comprising, means for constructing a specific structure that identifies an association between said source block in said cache memory and said buffer block in said first buffer, wherein said specific structure includes a next pointer, a buffer block count, and memory locations of said first error correction code and said second error correction code.

15. The system as claimed in claim 9, wherein said data stripe is a logical division of data stored in a redundant array of independent disk drives.

16. The system as claimed in claim 9, wherein said error correction code is parity information.

17. The system as claimed in claim 9, further comprising means for storing said data stripe in a redundant array of independent disk drives.

18. A system providing high bandwidth fault tolerance in a storage subsystem, comprising:
an array controller comprising an array processor coupled to a parity buffer and a source buffer, said array controller being adopted to calculate at least two parity values independently, wherein said parity buffer is at least twice size of the maximum stripe depth supported by said storage subsystem;
a cache memory coupled to said array processor, said cache memory storing a plurality of source blocks and a specific structure;
a memory fetch logic for reading a source block from said cache memory to said source buffer;
an XOR logic for computing a first parity value of said source block into a first block in said parity buffer and a second parity value of said source block into a second block in said parity buffer; and
an array of disk drives coupled to said array controller, said array of disk drives storing a plurality of data stripes that contains a plurality of source data blocks and a plurality of parity blocks,
wherein said array processor clears said plurality of buffer blocks in said parity buffer, said plurality of buffer blocks in said parity buffer that has been associated to one of said plurality of source blocks, and said storage subsystem uses one of said at least two parity values to reconstruct said data stripe when said data stripe has a faulted data block.

19. The system as claimed in claim 18, wherein said specific structure identifies an association between said source block in said cache memory and said buffer block in said parity buffer.

20. The system as claimed in claim 19, wherein said specific structure comprises a next pointer, a buffer block count, and a memory location of said first parity value and said second parity value.

* * * * *